P. R. NACK.
CASTER.
APPLICATION FILED MAR. 24, 1919.
1,345,622.
Patented July 6, 1920.
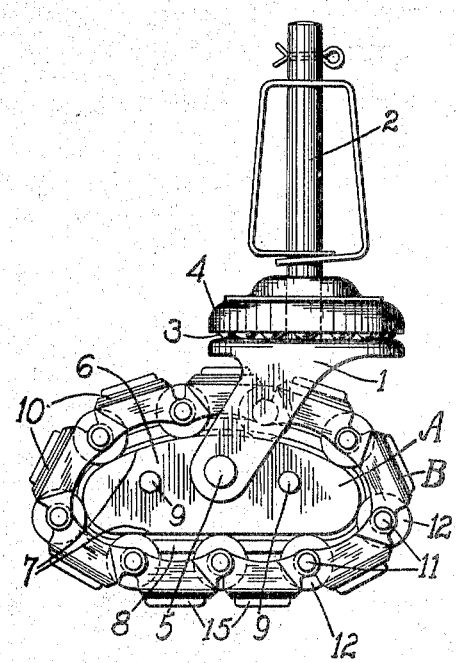
Fig. I
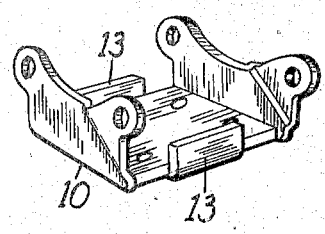
Fig. III
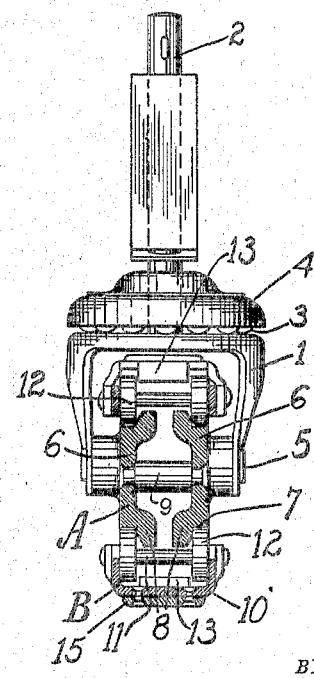
Fig. II
INVENTOR.
P. R. NACK
BY
ATTORNEYS

UNITED STATES PATENT OFFICE.

PETER R. NACK, OF ST. LOUIS, MISSOURI.

CASTER.

1,345,622.

Specification of Letters Patent. Patented July 6, 1920.

Application filed March 24, 1919. Serial No. 284,815.

*To all whom it may concern:*

Be it known that I, PETER R. NACK, a citizen of the United States of America, a resident of the city of St. Louis, in the State of Missouri, have invented certain new and useful Improvements in Casters, of which the following is a full, clear, and exact description, reference being had to the accompanying drawings, forming a part of this specification.

This invention relates to improvements in casters, one of the objects being to produce a strong and simple caster adapted to travel over floors or floor coverings, such as linoleum, without marring or scratching the surface of the floor or the like. To accomplish this, the caster is preferably provided with a foot surrounded by an endless flexible sole. This endless sole is free to travel around the foot and it may consist of an endless row of tread links having flat tread faces. Owing to the manner in which the parts are combined with each other, the tread links are placed upon and lifted from the floor without causing friction at the surface of the floor, thereby avoiding injury to the floor, and owing to the large area of the shoe in contact with the floor, a very heavy load can be supported by the caster without marring the floor. The weight is distributed over a flat surface of large area at the bottom face of the caster, instead of being concentrated at a single point, as is the case where the weight is supported by a ball or roller.

Figure I is a side elevation of the caster.

Fig. II is a vertical section, partly in elevation, the shoe and foot being shown in section.

Fig. III is a perspective view of one of the tread links.

The caster herein shown comprises a fork 1 depending from a vertical stem 2. A ball bearing 3, mounted on the fork 1, is covered by a rotary collar 4.

A designates an elongated foot mounted between the legs of the fork and pivoted thereto at 5, the pivot being approximately midway between the ends of the foot. This foot includes a pair of oppositely disposed side members 6, each having an endless marginal track 7 and a corresponding endless guard flange 8 extending from one side of the track. The side members 6 may be fastened together by means of rivets 9, as shown in the drawings, each rivet having reduced ends which extend through the pressed metal side members.

A flexible endless shoe B, surrounding the foot A, preferably comprises an endless row of tread links 10 having flat faces adapted to engage the floor. Pivot pins 11 connect the links 10, and anti-friction rollers 12 are mounted on these pins so as to travel on the endless tracks 7. To prevent independent movement transversely of the shoe, each link 10 has flanges 13 which lie between the rollers, said flanges being arranged to form recesses for portions of the rollers. The guard flanges 8 are inclined transversely to direct the rollers onto the tracks 7.

At the bottom face of the foot A, the tracks 7 are horizontal, and the lowermost links of the shoe occupy horizontal positions with their large flat faces engaging the floor. When the caster is in motion, the endless shoe travels around the foot A and as the links pass around the curved ends of the foot, their flat faced treads are placed upon the floor and lifted therefrom without in any way injuring the surface of the floor.

If desired, relatively soft tread members 15 made of leather or other yielding material may be secured to the metal tread links 10 by means of rivets, as shown at the lower portion of Fig. II.

I claim:

1. A caster provided with a pivot having a vertical axis, a leg movable around said axis, an elongated horizontally disposed foot secured to and extending from said leg, and a flexible endless shoe surrounding said horizontally disposed foot so as to separate said foot from the floor over which the caster travels, said foot and shoe being movable around said vertical axis and the shoe being free to travel around said foot.

2. A caster provided with a leg, a horizontally disposed foot pivoted to said leg, the bottom of the pivoted foot being provided with a horizontal track, and a flexible endless shoe whereby said pivoted foot is separated from the floor over which the caster travels, said endless shoe surrounding said pivoted foot so as to travel along said horizontal track.

3. A caster provided with a vertical pivot stem, a fork depending from said pivot stem, an elongated horizontally disposed foot arranged between and pivoted to the legs of said fork, and a flexible shoe surrounding the pivoted foot and separating the latter from the floor over which the caster travels, said shoe being free to travel around the pivoted foot.

4. A caster comprising a vertical pivot stem, a fork depending from said stem, a foot pivoted between the legs of said fork, a flexible endless shoe whereby said pivoted foot is separated from the floor over which the caster travels, said endless shoe surrounding said pivoted foot and comprising an endless row of tread links pivotally connected together, and anti-friction rollers carried by said tread links, said pivoted foot being provided with a track for said rollers.

In testimony that I claim the foregoing I hereunto affix my signature.

PETER R. NACK.